(12) United States Patent
Calder et al.

(10) Patent No.: US 8,516,137 B2
(45) Date of Patent: Aug. 20, 2013

(54) MANAGING VIRTUAL HARD DRIVES AS BLOBS

(75) Inventors: Bradley Gene Calder, Bellevue, WA (US); Andrew James Edwards, Bellevue, WA (US); Ju Wang, Redmond, WA (US); Samer Arafeh, Sammamish, WA (US); Anu Engineer, Redmond, WA (US); Yue Zuo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 498 days.

(21) Appl. No.: 12/619,307

(22) Filed: Nov. 16, 2009

(65) Prior Publication Data

US 2011/0119668 A1    May 19, 2011

(51) Int. Cl.
*G06F 15/16* (2006.01)

(52) U.S. Cl.
USPC ............... 709/229; 709/227; 718/1; 711/162

(58) Field of Classification Search
USPC ................................. 709/227, 229
See application file for complete search history.

(56) References Cited

U.S. PATENT DOCUMENTS

| | | | |
|---|---|---|---|
| 5,515,531 A | 5/1996 | Fujiwara et al. | |
| 5,678,046 A | 10/1997 | Cahill et al. | |
| 5,999,943 A | 12/1999 | Nori et al. | |
| 6,061,690 A | 5/2000 | Nori et al. | |
| 6,119,123 A | 9/2000 | Elenbaas | |
| 6,275,831 B1 | 8/2001 | Bodnar et al. | |
| 6,484,161 B1 | 11/2002 | Chipalkatti et al. | |
| 6,523,036 B1 | 2/2003 | Hickman | |
| 6,571,282 B1 | 5/2003 | Bowman-Amuah | |
| 6,615,219 B1 | 9/2003 | Bruso | |
| 6,643,640 B1 | 11/2003 | Getchius et al. | |
| 6,714,968 B1 | 3/2004 | Prust | |
| 6,735,623 B1 | 5/2004 | Prust | |
| 6,785,768 B2 | 8/2004 | Peters | |
| 6,952,724 B2 | 10/2005 | Prust | |
| 7,046,687 B1 | 5/2006 | Brown | |
| 7,082,455 B2 | 7/2006 | Hu | |
| 7,127,507 B1 | 10/2006 | Clark et al. | |
| 7,139,280 B2 | 11/2006 | Mansour et al. | |
| 7,158,964 B2 | 1/2007 | Worlich | |
| 7,199,725 B2 | 4/2007 | Gilfix et al. | |
| 7,330,717 B2 | 2/2008 | Gidron et al. | |
| 7,558,859 B2 | 7/2009 | Kasiolas | |

(Continued)

OTHER PUBLICATIONS

Aidan McCarron, "A Cloud Based OS or Not?"—Published Date: Jan. 26, 2009, http://www.aidanmccarron.com/?cat=31.

(Continued)

*Primary Examiner* — Wing F Chan
*Assistant Examiner* — Andrew Woo
(74) *Attorney, Agent, or Firm* — Shook Hardy & Bacon LLP

(57) ABSTRACT

Cloud computing platforms having computer-readable media that perform methods to manage virtual hard drives as blobs are provided. The cloud computing platform includes fabric computers and blob stores. The fabric computers execute virtual machines that implement one or more applications that access virtual hard drives. The data in the virtual hard drives is accessed, via a blob interface, from blobs in the blob stores. The blob stores interface with a driver that translates some application input/output (I/O) requests destined to the virtual hard drives to blob commands when accessing data in the virtual hard drives.

14 Claims, 4 Drawing Sheets

(56) References Cited

U.S. PATENT DOCUMENTS

| | | | |
|---|---|---|---|
| 8,239,479 | B2 | 8/2012 | Sagar et al. |
| 2002/0162047 | A1 | 10/2002 | Peters et al. |
| 2003/0028640 | A1 | 2/2003 | Malik |
| 2004/0133544 | A1* | 7/2004 | Kiessig et al. ............... 707/1 |
| 2004/0212639 | A1 | 10/2004 | Smoot |
| 2004/0215724 | A1 | 10/2004 | Smoot |
| 2005/0099318 | A1 | 5/2005 | Gilfix et al. |
| 2005/0125411 | A1 | 6/2005 | Kilian |
| 2005/0183082 | A1 | 8/2005 | Lewites et al. |
| 2005/0256972 | A1* | 11/2005 | Cochran et al. ............ 709/245 |
| 2006/0031268 | A1 | 2/2006 | Shutt |
| 2006/0155781 | A1 | 7/2006 | MacCormick |
| 2006/0241968 | A1 | 10/2006 | Hollebeek |
| 2006/0282457 | A1 | 12/2006 | Williams |
| 2006/0282481 | A1 | 12/2006 | Zhou |
| 2007/0011147 | A1 | 1/2007 | Falkenberg |
| 2007/0030853 | A1 | 2/2007 | Rogers |
| 2007/0050399 | A1 | 3/2007 | George |
| 2007/0282806 | A1 | 12/2007 | Hoffman |
| 2007/0283009 | A1 | 12/2007 | Takemura |
| 2008/0021865 | A1 | 1/2008 | Corkill |
| 2008/0091698 | A1* | 4/2008 | Cook et al. ................ 707/101 |
| 2008/0195668 | A1 | 8/2008 | Chandrasekar et al. |
| 2008/0243945 | A1 | 10/2008 | Hanus et al. |
| 2008/0244292 | A1 | 10/2008 | Kumar et al. |
| 2008/0313496 | A1 | 12/2008 | Prabhakaran |
| 2008/0317068 | A1* | 12/2008 | Sagar et al. ................ 370/503 |
| 2008/0320295 | A1 | 12/2008 | Chong et al. |
| 2009/0216910 | A1* | 8/2009 | Duchesneau ............. 709/250 |
| 2010/0106695 | A1 | 4/2010 | Calder |
| 2010/0106734 | A1 | 4/2010 | Calder |
| 2010/0150120 | A1 | 6/2010 | Schlight |
| 2010/0205157 | A1 | 8/2010 | Hanus et al. |
| 2011/0029785 | A1 | 2/2011 | Foster et al. |

OTHER PUBLICATIONS

Joshy Joseph, "Patterns for High Availability, Scalability, and Computing Power with Windows Azure"—msdn Magazine, Published: 2009, http://msdn.microsoft.com/en-us/magazine/dd727504.aspx.

David Chappell, "Windows Azure and ISVS, A Guide for Decision Makers"—David Chappell & Associates, Sponsored by Microsoft Corporation, Published: Jul. 2009.

"Manage all your Cloud Storage Services on Desktop Using Gladinet"—Programmer Fish, Retrieved Date: Sep. 17, 2009, http://www.programmerfish.com/manage-all-your-cloud-storage-services-on-desktop-using-gladinet/.

David Chappell, "Introducing Windows Azure"—David Chappell & Associates, Sponsored by Microsoft Corporation, Published: Mar. 2009.

"Citrix XenServer"—Citrix Systems, Inc., Retrieved Date: Sep. 17, 2009, http://www.citrix.com/English/ps2/products/feature.asp?contentID=1686939.

"Amazon Elastic Compute Cloud, Getting Started Guide, API Version Aug. 15, 2009"—Amazon Web Services, Published Date: Aug. 15, 2009, http://awsdocs.s3.amazonaws.com/EC2/latest/ec2-gsg.pdf.

"Amazon Elastic Compute Cloud, Developer Guide, API Version Aug. 15, 2009"—Amazon Web Services, Published Date: Aug. 15, 2009, http://awsdocs.s3.amazonaws.com/EC2/latest/ec2-dg.pdf.

"Amazon Elastic Compute Cloud, User Guide, API Version Aug. 15, 2009"—Amazon Web Services, Published Date: Aug. 15, 2009, http://awsdocs.s3.amazonaws.com/EC2/latest/ec2-ug.pdf.

"Amazon CloudWatch, Developer Guide, API Version May 15, 2009"—Amazon Web Services, Published Date: May 15, 2009, http://awsdocs.s3.amazonaws.com/AmazonCloudWatch/latest/acw-dg.pdf.

"Amazon Auto Scaling, Developer Guide, API Version May 15, 2009"—Amazon Web Services, Published Date: May 15, 2009, http://awsdocs.s3.amazonaws.com/AutoScaling/latest/as-dg.pdf.

"Amazon Elastic Load Balancing, Developer Guide, API Version May 15, 2009"—Amazon Web Services, Published Date: May 15, 2009, http://awsdocs.s3.amazonaws.com/ElasticLoadBalancing/latest/elb-dg.pdf.

"Amazon SimpleDB, Getting Started Guide, API Version Apr. 15, 2009"—Amazon Web Services, Published Date: Apr. 15, 2009, http://awsdocs.s3.amazonaws.com/SDB/latest/sdb-gsg.pdf.

"Amazon SimpleDB, Developer Guide, API Version Apr. 15, 2009"—Amazon Web Services, Published Date: Apr. 15, 2009, http://awsdocs.s3.amazonaws.com/SDB/latest/sdb-dg.pdf.

"Amazon Simple Storage Service, Getting Started Guide, API Version Mar. 1, 2006"—Amazon Web Services, Published Date: Mar. 1, 2006, http://s3.amazonaws.com/awsdocs/S3/latest/s3-gsg.pdf.

"Amazon Simple Storage Service, Developer Guide, API Version Mar. 1, 2006"—Amazon Web Services, Published Date: Mar. 1, 2006, http://awsdocs.s3.amazonaws.com/S3/latest/s3-dg.pdf.

"AWS Import/Export, Programming Guide, Version 1.2"—Amazon Web Services, Retrieved Date: Oct. 16, 2009, http://s3.amazonaws.com/awsdocs/ImportExport/latest/AWSImportExport-dg.pdf.

"Amazon CloudFront, Getting Started Guide, API Version Apr. 2, 2009"—Amazon Web Services, Published Date: Apr. 2, 2009, http://awsdocs.s3.amazonaws.com/CF/latest/cf-gsg.pdf.

"Amazon CloudFront, Developer Guide, API Version Apr. 2, 2009"—Amazon Web Services, Published Date: Apr. 2, 2009, http://s3.amazonaws.com/awsdocs/CF/latest/cf_dg.pdf.

"Amazon Simple Queue Service, Getting Started Guide, API Version Feb. 1, 2009"—Amazon Web Services, Published Date: Feb. 1, 2009, http://awsdocs.s3.amazonaws.com/SQS/latest/sqs-gsg.pdf.

"Amazon Simple Queue Service, Developer Guide, API Version Feb. 1, 2009"—Amazon Web Services, Published Date: Feb. 1, 2009, http://awsdocs.s3.amazonaws.com/SQS/latest/sqs-dg.pdf.

"Amazon Elastic MapReduce, Getting Started Guide, API Version Mar. 31, 2009"—Amazon Web Services, Published Date: Mar. 31, 2009, http://s3.amazonaws.com/awsdocs/ElasticMapReduce/latest/emr-gsg.pdf.

"Amazon Elastic MapReduce, Developer Guide, API Version Mar. 31, 2009"—Amazon Web Services, Published Date: Mar. 31, 2009, http://s3.amazonaws.com/awsdocs/ElasticMapReduce/latest/emr-dg.pdf.

Fay Chang, et al., "Bigtable: A Distributed Storage System for Structured Data"—OSDI'06: Seventh Symposium on Operating System Design and Implementation, Seattle, WA, Nov. 2006.

"IETF WEBDAV Working Group, World Wide Web Distributed Authoring and Versioning"—Department of Information and Computer Science, University of California, Irvine, Content Last Modified: Jul. 3, 2003, http://www.ics.uci.edu/~ejw/authoring/.

Y. Goland, et al., "HTTP Extensions for Distributed Authoring—WEBDAV"—The Internet Society, Published: Feb. 1999, http://www.ics.uci.edu/~ejw/authoring/protocol/rfc2518.pdf.

Geoffrey Clemm, et al., "Versioning Extensions to WebDAV (Web Distributed Authoring and Versioning)"—The Internet Society, Published: Mar. 2002, http://www.webdav.org/deltav/protocol/rfc3253.html.

Geoffrey Clemm, et al., "Web Distributed Authoring and Versioning (WebDAV) Access Control Protocol"—The Internet Society, Published: May 2004, http://www.webdav.org/specs/rfc3744.pdf.

Jim Whitehead and Julian F. Reschke, "Web Distributed Authoring and Versioning (WebDAV) Ordered Collections Protocol"—The Internet Society, Published: Dec. 2003, http://www.webdav.org/specs/rfc3648.pdf.

Judith Slein, et al., "Requirements for a Distributed Authoring and Versioning Protocol for the World Wide Web"—The Internet Society, Published: Feb. 1998, http://asg.andrew.cmu.edu/rfc/rfc2291.html.

L. Dusseault and J. Crawford, "HTTP Extensions for Distributed Authoring—WebDAV RFC2518 bis"—The Internet Society, Published: Jun. 2003, http://www.ics.uci.edu/~ejw/authoring/protocol/draft-ietf-webdav-rfc2518bis-04.txt.

"WebDAV BIND Protocol, Creating multiple mappings to the same resource"—Retrieved Date: Oct. 16, 2009, http://www.webdav.org/bind/.

Jim Whitehead, Geoff Clemm, and Julian F. Reschke, "Web Distributed Authoring and Versioning (WebDAV) Redirect Reference Resources"—The Internet Society, Published: Mar. 2006, http://greenbytes.de/tech/webdav/rfc4437.html.

J. Slein and J. Davis, "Requirements for Advanced Collection Functionality in WebDAV"—Published Date: Jun. 18, 1999, http://www.ics.uci.edu/~ejw/authoring/collection/draft-ietf-webdav-collection-reqts-05.txt.

Julian F. Reschke, "Datatypes for Web Distributed Authoring and Versioning (WebDAV) Properties"—The Internet Society, Published: Dec. 2005, http://greenbytes.de/tech/webdav/rfc4316.html.

Julian F. Reschke and Stefan Eissing, "Including additional properties in WebDAV PROPFIND/allprop requests"—The Internet Society, Published: Jan. 2006, http://www.greenbytes.de/tech/webdav/draft-reschke-webdav-allprop-include-latest.html.

J. Stracke, "Use of Dublin Core Metadata in WebDAV"—Published Date: Jun. 8, 1999, http://www.ics.uci.edu/~ejw/authoring/dc/draft-ietf-webdav-dublin-core-01.txt.

Alex Hopmann and Lisa Lippert, "Additional WebDAV Collection Properties"—Published: Dec. 1998, http://www.ics.uci.edu/~ejw/authoring/props/draft-hopmann-collection-props-00.txt.

J. Stracke, "WebDAV PROPFIND Extension to List Specified Namespaces"—Published Date: Aug. 10, 1999, http://www.ics.uci.edu/~ejw/authoring/props/draft-ietf-webdav-propfind-space-00.txt.

James Amsden, "Proposed Extensions to WebDAV Properties"—Published: Sep. 1999, http://www.ics.uci.edu/~ejw/authoring/props/draft-ietf-webdav-properties-extension-00.txt.

John Stracke, "Encoding a DAV resource in MIME"—The Internet Society, Published Date: Feb. 25, 1999, http://www.ics.uci.edu/~ejw/authoring/mime-res/draft-stracke-webdav-mime-resource-00.txt.

Ora Lasilla, "HTTP-based Distributed Content Editing Scenarios"—Published: May 1997, http://www.ics.uci.edu/~ejw/authoring/scenarios/draft-ietf-webdav-scenarios-00.txt.

Paul J. Leach and Rich Salz, "UUIDs and GUIDs"—The Internet Society, Published Date: Feb. 4, 1998, http://www.ics.uci.edu/~ejw/authoring/uuid-guid/draft-leach-uuids-guids-01.txt.

David Chappell, "Introducing the Windows Azure Platform, An Early Look At Windows Azure, SQL Azure, and NET Services"—David Chappell & Associates, Sponsored by Microsoft Corporation, Published: Aug. 2009.

Ben James, "NetMass Settles Cloud Computing, Storage Suit", Law 360, Nov. 20, 2009, http://ip.law360.com/articles/135568.

Roger Cummings, "Storage Network Management"—SNIA Technical Tutorial, Storage Networking Industry Association, Published Date: Mar. 2, 2004, http://www.snia.org/education/storage_networking_primer/stor_mngmnt/sniasnmbooklet_final.pdf.

Chris Richardson, "Groovy on a Cloud: Testing Java™ Platform, Enterprise Edition (Java EE Platform) Applications on Amazon EC2"—2008 JavaOne Conference, Sun Microsystems, Retrieved Date: Sep. 17, 2009, http://developers.sun.com/learning/javaoneonline/2008/pdf/TS-5274.pdf.

Office Action mailed Feb. 3, 2011 in U.S. Appl. No. 12/257,747.

"Grids—An Architecture for Managing Very Large Orthoimage Mosaics in a Database Frameworkhttp://www.ifp.uni-stuttgart.de/publications/CommIV/nebiker22.pdf".

"DB2 goes Hybrid: Integrating Native XML and XQuery with Relational Data and SQLhttp://www-tr.watson.ibm.com/journal/sj/452/beyer.pdf".

"Embedded Predictive Modeling in a Parallel Relational Databasehttp://researchweb.watson.ibm.com/dar/papers/pdf/sac_2006_final.pdf".

Ghemawat et al., The Google File System, http://www.cs.cornell.edu/Courses/cs614/2004sp/papers/gfs.pdf.

Right Scale Blog, Why Amazon's Elastic Block Store Matters, http://blog.rightscale.com/2008/08/20/why-amason-ebs-matters/, Aug. 20, 2008.

Amazon EBS—Elastic Block Store has launched—All Things Distributed, httbb://www.allthingsdistributed.com/2008/08/amazon_ebs_elastic_block_store.html, Aug. 28, 2008.

Chang et al., Bigtable: A Distributed Storage System for Structured Data, labs.google.com/papers/bigtable-osdi06.pdf.

Office Action mailed May 19, 2011 in U.S. Appl. No. 12/257,786, 24 pages.

Notification of Transmittal of the International Search Report and the Written Opinion of the International Searching Authority, or the Declaration in PCT/US2010/054701 dated Jul. 1, 2011, 11 pages.

Final Office Action in U.S. Appl. No. 12/257,747 mailed Aug. 17, 2011, 12 pages.

Final Office Action in U.S. Appl. No. 12/257,786, mailed Dec. 1, 2011, 20 pp.

Non-Final Office Action in U.S. Appl. No. 12/257,747, mailed Mar. 6, 2012, 13 pp.

Non-Final Office Action, U.S. Appl. No. 12/605,706, mailed Jul. 8, 2011, 13 pp.

Notice of Allowance, U.S. Appl. No. 12/605,706, mailed May 1, 2012, 9 pp.

Weil, "CEPH: Reliable, Scalable, and High-Performance Distributed Storage", (University of California, Santa Cruz, Dec. 2007), 238 pp.

Final Office Action in U.S. Appl. No. 12/257,747 mailed Jan. 30, 2013.

Non Final Office Action, mailed Feb. 27, 2013, U.S. Appl. No. 13/471,706.

Notice of Allowance, mailed 08/13/2, U.S. Appl. No. 12/605,706.

Notice of Allownace, mailed Nov. 16, 2011—U.S. Appl. No. 12/605,706.

Restriction Requirements, mailed Mar. 2, 2011, U.S. Appl. No. 12/605,706.

Notice of Allowance, mailed Mar. 25, 2013, U.S. Appl. No. 12/257,786.

Restriction Requirements, mailed Feb. 3, 2011, U.S. Appl. No. 12/257,786.

Restriction Requirements, mailed Dec. 7, 2010, U.S. Appl. No. 12/257,747.

Non-Final Office Action in U.S. Appl. No. 12/257,786 mailed Oct. 9, 2012.

* cited by examiner

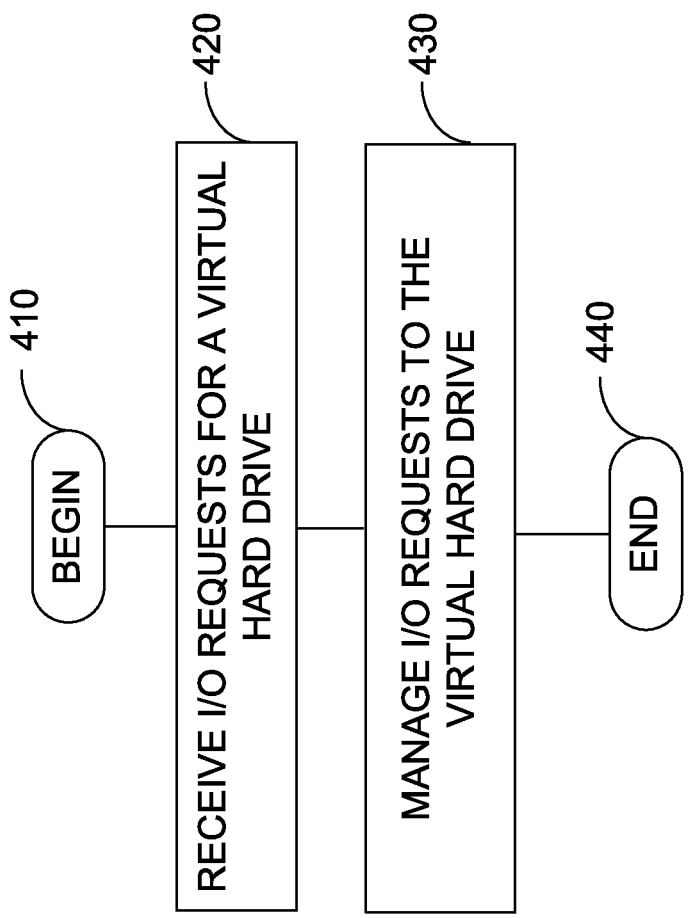

MANAGING VIRTUAL HARD DRIVES AS BLOBS

CROSS-REFERENCE TO RELATED APPLICATIONS

This application is related to subject matter in the invention disclosed in the following U.S. patent applications: U.S. application Ser. No. 12/257,786, entitled "Blob Manipulation in an Integrated Structured Storage System"—and U.S. application Ser. No. 12/257,747, entitled "Scalable Blob Storage Integrated with Scalable Structured Storage," which are assigned or under obligation of assignment to the same entity as this application, and incorporated in this application by reference.

BACKGROUND

Conventionally, cloud computing platforms host software applications in an Internet-accessible virtual environment. The cloud computing platform allows an organization to use datacenters designed and maintained by third parties. The conventional virtual environment supplies small or large organizations with requested hardware resources, software application resources, network resources, and storage resources. The virtual environment also provides application security, application reliability, application scalability, and availability.

The conventional datacenters provide the physical computing resources, physical storage resources, and physical network resources. The physical resources in the data center are virtualized and exposed to the organizations as a set of application programming interfaces. The organizations do not need to maintain their own hardware resources or software resources, or maintain datacenters that are reliable and scalable.

The organizations may access these physical resources efficiently through the virtual environment without knowing the details of the software or the underlying physical hardware.

SUMMARY

Embodiments of the invention relate, in one regard, to cloud computing platforms, computer-readable media, and computer-implemented methods that manage virtual hard drives in a cloud computing platform. The cloud computing platform includes fabric computers and blob stores that are used to access the virtual hard drives. The blob store is a durable cloud storage system that uses replication to keep several copies of each blob to ensure that the stored blobs are available and durable.

The fabric computers are configured to execute virtual machines that implement applications, which access virtual hard drives to read and write data via input/output (I/O) requests. The fabric computers include drive libraries, drivers, local caches, and interfaces to the blob store. The applications generate the I/O requests. In turn, the I/O requests are redirected to drivers that translate the I/O requests to blob commands. The drivers may complete the I/O requests with data stored in the local caches or the drivers may access the blob stores to obtain data stored in a blob associated with a virtual hard drive accessed by the I/O request. The blob commands are used to access the blob stores. The blob stores are configured to store blobs that are exposed as virtual hard drives to the applications. The application programming interfaces and semantics that enable access to the blobs are different from the application programming interfaces and semantics the application executes to access the virtual hard drives.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

FIG. 4 is a logic diagram that illustrates an exemplary method to manage I/O requests to a virtual hard drive.

DETAILED DESCRIPTION

Figure 1:
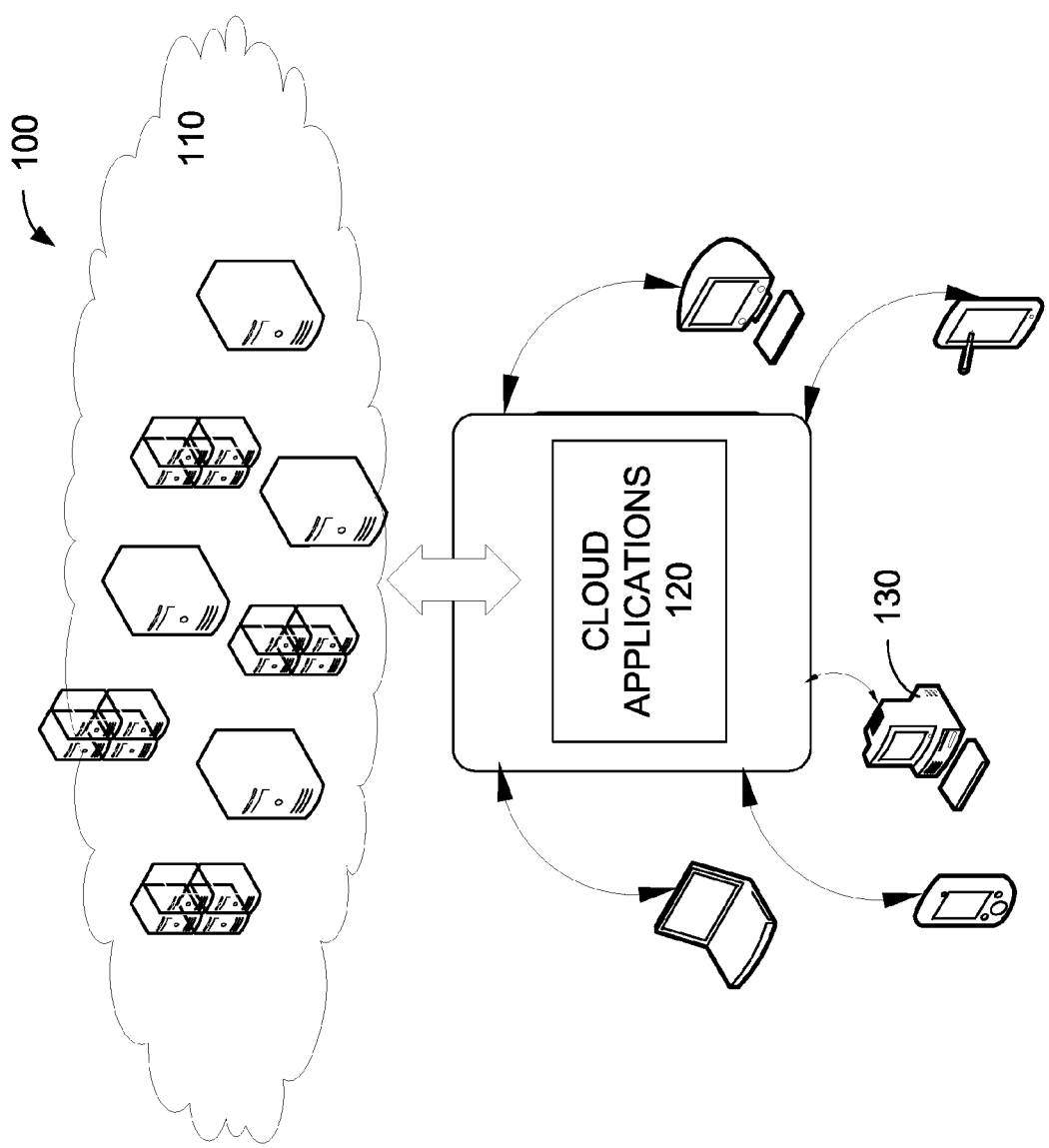
FIG. 1 is a network diagram that illustrates an exemplary cloud computing platform in accordance with embodiments of the invention.

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this patent, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

As utilized herein, the term "blob" refers to a binary large object.

In some embodiments, applications running in the cloud computing platform access data in file systems stored in durable and available virtual hard drives. The data in the virtual hard drives remain available in the event of a software or hardware failure (e.g., drive failure, node failure, rack failure, bit rot, etc.). The applications may use application programming interfaces (APIs) and semantics, such as Windows® NTFS APIs, to access data stored in the virtual hard drives.

In one embodiment, the virtual hard drives are mountable block level virtual devices. The virtual hard drives allow the applications running on a virtual machine within the cloud computing platform to access data in the virtual hard drive using any file system API that interfaces with storage for the application. The virtual hard drives are durable and prevent loss of data for all writes by committing the writes to the blob store. The virtual hard drives are blobs. The content of the virtual hard drives and metadata associated with the virtual hard drives are stored in the blobs. The blobs may be uploaded from, or downloaded to, the blob store via a blob interface. Additionally, the blob interface may allow the applications to mount a virtual hard drive associated with the blob and access the data stored in the virtual hard drive.

The virtual hard drive, in some embodiments, is mounted as a volume by the applications. Application I/O requests are redirected to blobs stored in the blob store. In one embodiment, writes to a blob are made durable by storing the written data in the blob store, which acknowledges successful writes to the applications after the writes are made durable in the blob store. When the virtual hard drive is unmounted or the virtual machine that mounted the drives fails, the blob associated with the virtual hard drives persists in the durable blob store. Accordingly, another virtual machine may mount the same blob associated with the virtual hard drive and access the data stored in the blob.

The cloud computing platform enables, among other things, migration and execution of legacy applications, including relational databases, that may use storage resources; survival of data on the virtual machine during failure or shutdown; memorial of data for use by other virtual machines; and concurrent data sharing among many virtual machines. The migration and execution of legacy applications allow the virtual machine to execute applications that are configured to initiate I/O requests via the Windows® NTFS file system. The virtual machines also execute relational databases that use structured query language (SQL), such as mySQL, or Oracle without having to perform additional database mirroring. A virtual machine stores data to the virtual hard drives, and the data stored in the virtual hard drive is available to the additional virtual machine if the current virtual machine fails. Snapshots memorialize the current state of a blob associated with a virtual hard drive. A snapshot may be used to create read only virtual hard drives that are accessible by the virtual machine. The data stored in the virtual hard drives may be available to many virtual machines concurrently. In one embodiment, the cloud computing platform updates the virtual hard drive, creates a snapshot, and then shares the snapshot to other virtual machines.

In one embodiment, the cloud computing platform may expose physical machines as virtual machines. The physical machines may be accessed via commands used by the virtual machines.

As one skilled in the art will appreciate, the cloud computing platform may include hardware, software, or a combination of hardware and software. The hardware includes processors and memories configured to execute instructions stored in the memories. In one embodiment, the memories include computer-readable media that store a computer-program product having computer-useable instructions for a computer-implemented method. Computer-readable media include both volatile and nonvolatile media, removable and nonremovable media, and media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, and other magnetic storage devices. These memory technologies can store data momentarily, temporarily, or permanently.

In one embodiment, the cloud computing platform includes cloud applications that are available to client devices. The client devices access the cloud computing platform to execute the cloud applications. The cloud applications are implemented using storage and processing resources available in the cloud computing platform.

FIG. 1 is a network diagram that illustrates an exemplary computing system 100 in accordance with embodiments of the invention. The computing system 100 shown in FIG. 1 is merely exemplary and is not intended to suggest any limitation as to scope or functionality. Embodiments of the invention are operable with numerous other configurations. With reference to FIG. 1, the computing system 100 includes a cloud computing platform 110, cloud applications 120, and client devices 130.

The cloud computing platform 110 is configured to execute cloud applications 120 requested by the client devices 130. The cloud computing platform 110 maintains a blob store. The blob store provide blobs that store data accessed by cloud applications 120. The cloud computing platform 110 connects to the client devices 130 via a communications network, such as a wireless network, local area network, wired network, or the Internet.

The cloud applications 120 are available to the client devices 130. The software executed on the cloud computing platform 110 implements the cloud applications 120. In one embodiment, virtual machines in the cloud computing platform 110 execute the cloud applications 120. The cloud applications 120 may include editing applications, network management applications, finance applications, or any application requested or developed by the client devices 130. In certain embodiments, some functionality of the cloud application 130 may be executed on the client devices 130.

The client devices 130 are utilized by a user to interact with cloud applications 120 provided by the cloud computing platform 110. The client devices 130, in some embodiments, must register with the cloud computing platform 110 to access the cloud applications 120. Any client device 130 with an account from the cloud computing platform 110 may access the cloud applications 120 and other resources provided in the cloud computing platform 110. The client devices 130 include, without limitation, personal digital assistants, smart phones, laptops, personal computers, gaming systems, set-top boxes, or any other suitable client computing device. The client devices 130 include user and system information storage to store user and system information on the client devices 130. The user information may include search histories, cookies, and passwords. The system information may include internet protocol addresses, cached Web pages, and system utilization. The client devices 130 communicate with the cloud computing platform 110 to receive results from the cloud applications 120.

Accordingly, the computing system 100 is configured with a cloud computing platform 110 that provides cloud applications 120 to the client devices 130. The cloud applications 120 remove the burden of updating and managing multiple local client applications on the client devices 130.

In certain embodiments, the cloud computing platform provides fabric computers and blob stores. The fabric computers execute cloud applications in one or more virtual machines. The blob store stores data use by the cloud applications. In turn, the cloud applications interface with the blobs as virtual hard drives via a driver that translates cloud application I/O requests to blob commands.

Figure 2:
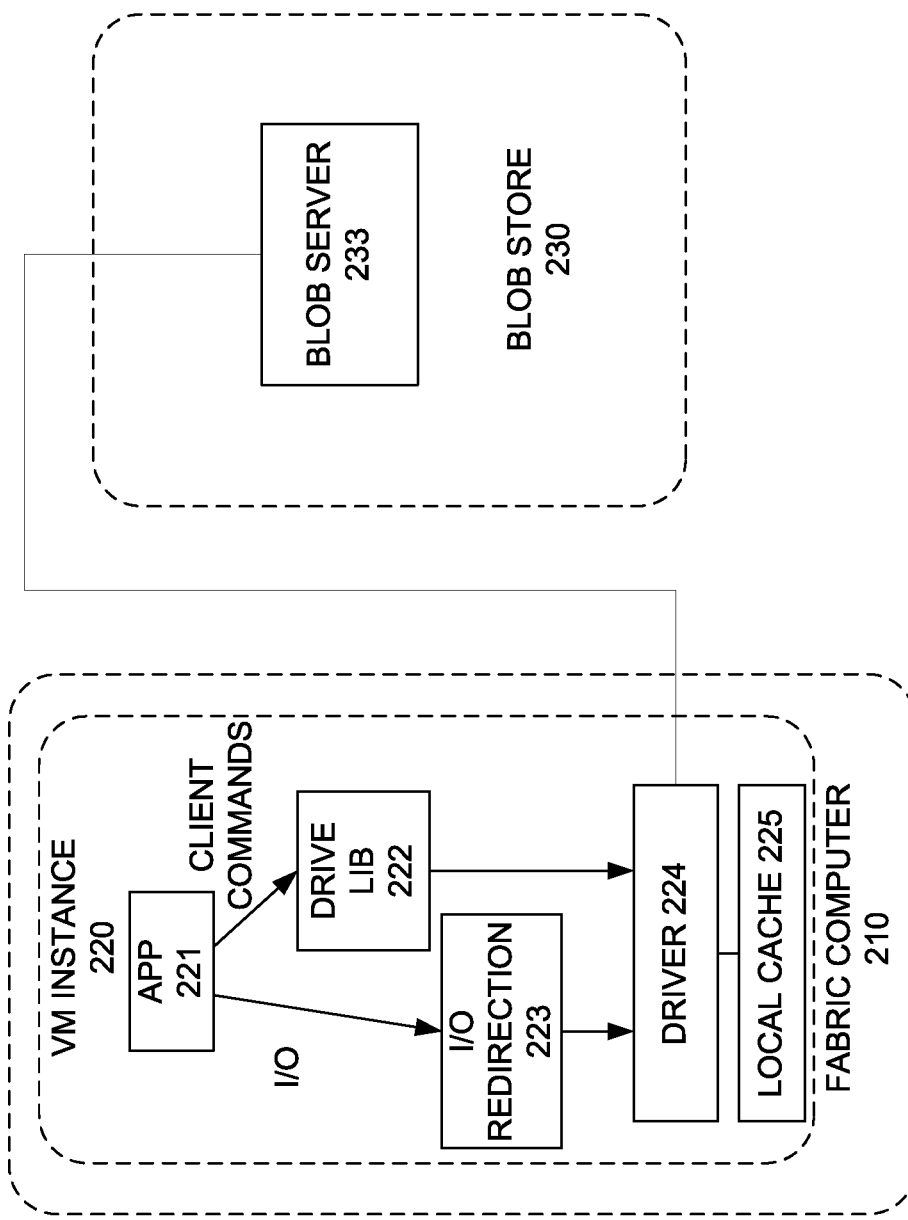
FIG. 2 is a block diagram that illustrates an exemplary fabric computer and an exemplary blob store in the exemplary cloud computing platform.

FIG. 2 is a block diagram that illustrates an exemplary fabric computer 210 and an exemplary blob store 230 in the exemplary cloud computing platform. The fabric computer 210 executes a virtual machine 220 that implements cloud application 221. The blob store 230 is accessible by the fabric computer 210 via an Internet protocol (IP) address. In one embodiment, the cloud application 221 may be executed by the fabric computer 210, which in turn accesses the blob store to obtain a blob that implements a virtual hard drive used by the cloud application 221.

The virtual machine 220 includes a drive library 222, I/O redirection 223, a driver 224, and local cache 225. The drive library 222 may provide drive management, and the I/O redirection 223 may enables access to the content stored in the virtual hard drive by redirecting drive commands to driver 224, which translates the drive commands to blob commands. In one embodiment, the virtual machine 220 may access data in a blob corresponding to a virtual hard drive (VHD) using drive commands, such as, CreateDrive, DeleteDrive, ListDrive, MountDrive, UnmountDrive, and SnapshotDrive stored in the drive library 222. In one embodiment, the drive library 222 may provide the virtual machine 220 with a blob namespace to locate the drive commands. For instance, the virtual machine 220 may locate the blob namespace by accessing a uniform resource locator, e.g., http://<accountname>.blob.core.windows.net/<containername>/<blobname>, in the drive library 222, where accountname is a name of the account registered by a user of the cloud computing platform, containername is the name of the blob store, and blobname is the name of the blob.

In turn, the virtual machine 220 may issue I/O requests to the VHD. The I/O requests are translated by the driver 224 to blob commands. The blobs in the blob store 230 may be exposed as virtual hard drives (VHDs) to the cloud application 221 executing on the virtual machine 220. In one embodiment, the VHD may be a special type of blob (e.g., page blob), which can be mounted by the cloud application 221 with a time-limited lease. The VHD may be accessed by any cloud application 221 using file system semantics, e.g., Windows® NTFS semantics or drive commands contained in drive library 222.

The I/O request issued to the VHD is received by I/O redirection 223. I/O redirection 223 is a component configured to forward the cloud application I/O requests destined for a VHD to the driver 224.

In certain embodiments, the driver 224 provides and/or implements an interface used by the cloud application to translate drive commands received, from the cloud application, to blob commands, such as, LeaseBlob, SnapShotBlob, PutPage, ClearPage, GetBlob, etc. The driver 224 also translates cloud application I/O requests destined to the mounted virtual hard drive to blob commands that are transmitted to, and processed by, the blob store 230. The driver 224 may manage a local cache 225 for the virtual hard drive to store data that is stored in the blob corresponding to the virtual hard drive. The driver 224 may use the local cache 225 to retrieve data corresponding to read operations from the cloud application 221. The write operations from the cloud application 221 may be transmitted to both the local cache 225 and the blob in the blob store 230. In other embodiments, the driver 224 may manage leases corresponding to virtual hard drives to prevent a cloud application from accessing data in the local cache 225 or in the blob store when a lease is expired.

Each local cache 225 is associated with a single VHD. The local cache 225 for a mounted VHD may be located on the same fabric computer 210 or the local cache 225 may be located on a computing resource within the same rack of the fabric computer 210 that mounted the VHD. This configuration may save network bandwidth. In some embodiments, the virtual machine 220 may request multiple VHDs. For each VHD, the virtual machine may specify the amount of disk drive space on the fabric computer to use as the local cache 225. The data stored in the local cache 225 may be cyclic redundancy checked (CRC'ed) to prevent the virtual machine 220 from using data that contains errors.

In certain embodiments, the local cache 225 is synchronized with a corresponding blob of the VHD. The driver 224 may manage the local cache 225. The driver 224 may be configured to hold off writing to the local cache 225 until an acknowledgement is received from the blob in the blob store 230. Alternatively, the driver 224 may write both to the local cache 225 and to the blob store 230 in parallel. If the virtual machine 220 crashes and resets while writing in parallel to the blob store 230, the virtual machine 220 may try to remount the virtual hard drive and reuse the corresponding local cache 225. The virtual machine 220 may check the local cache 225 to determine which data blocks were speculatively written to the local cache 225 without an acknowledgement from the blob store 230. In turn, the virtual machine 220 may flush the local cache 225 of the unacknowledged data blocks. In other embodiments, the virtual machine 220 may flush the entire local cache 225 or a selected portion of the local cache 225. The local cache 225 stores the data frequently used by the virtual machine 220 on the fabric computer 210. The local cache 225 reduces the number of reads requested from the blob store 230, which saves network bandwidth and reduces network contention. Additionally, the virtual machine 220 may experience performance improvements due to the reduced latency obtained by retrieving data reads from the local cache 225. In some embodiments, a virtual machine experiencing high connectivity (e.g., 10 Gbps) to the blob store 230 may not use the local cache 225.

The blob store 230 is connected to fabric computer 210. The fabric computer 210 accesses the blob store 230 through an IP address. The blob store 230 includes blob servers 233. The blob servers 233 interface with the fabric computer 210, control access to blobs, and implement the blob commands on the blobs. The blob server 233 is part of a replicated blob storage system, where the stored blobs are replicated across several servers to create copies of the blob that are maintained separately in case there is a drive, node, or rack failure. This ensures that the blobs are available and durable in the face of failures.

The blob commands received from the driver 224, or a cloud application 221, when accessing the blob, include LeaseBlob, SnapshotBlob, PutPage, ClearPage, and GetBlob.

The LeaseBlob command causes the blob store 230 to create a lease for a blob stored on the blob store 230. In some embodiments, the lease is an exclusive write lease, which allows only one cloud application 221 to write to the blob. When obtaining an exclusive write lease, a lease identifier (ID) is created by the blob server 233 and returned to the cloud application 221. The driver 224 stores the lease ID and includes the lease ID with any writes that are transmitted to the blob store 230. The LeaseBlob command also supports exclusive read-write leases and other types of leases. In some embodiments, the LeaseBlob command allows the driver 224 to specify the duration of the lease. The LeaseBlob command may be used by the driver 224 to renew the lease or terminate the lease.

The SnapshotBlob command causes the blob store to create a snapshot of the data in the blob. The snapshot is read only. The driver 224 may use this command to enable concurrent access to the contents of a blob. One or more snapshots of the same blob may be concurrently accessed by two or more cloud applications. The snapshots may provide versioning for the blob. The snapshots for a blob are accessed based on the name of the blob and a version timestamp that is auto-created (in case of multiple versions) by the blob server 233. In other words, when a blob is updated snapshots created before and after the blob update contain different version timestamps. In certain embodiments, the cloud application may cause the driver 224 to send metadata to the blob store for a snapshot. The metadata may be used to describe the snapshot or to quickly locate the snapshot.

The PutPage command causes the blob server 233 to store a range of pages at a specified address in the blob store 230. Each page may consist of a range of memory blocks in the primary storage device. The PutPage command may be used by the driver 224 to write data to the blob store. An offset may be specified to allow storage within any valid address in the blob store 230. The pages do not have to be written in order and there may be gaps (e.g., empty blocks) in the address space of the blob. For instance, the driver 224 may put a 4 KB page at offset 0, and another one at offset 4 KB*1 million in the blob store 230. The blob store 230 may store those 2 pages at the specified addresses. These pages are committed to the blob store 230 after a successful PutPage command. In turn, the blob store 230 acknowledges success to the driver 224. The PutPage command causes the blob server 233 to check the lease ID before updating the blob. When an exclusive write lease is specified for a blob, the PutPage command is successful when an valid lease ID is specified by the driver while requesting the update to the blob. When a lease expires, a PutPage command will be unsuccessful and the blob server 233 may remove the expired lease ID.

The ClearPage command causes the blob server 233 to clear a specific page or range of pages from the blob store 230. The driver 224 transmits a ClearPage command to remove pages from the blob in response to a cloud application 221 request to delete data from the virtual hard drive. The ClearPage command causes the blob server 233 to ensure a valid lease ID is specified for the blob associated with the VHD before removing the pages having the data that is the subject of the delete request. When a lease expires, a ClearPage command will be unsuccessful and the blob server 233 may clear the expired lease ID.

The GetBlob command causes the blob server 233 to retrieve a whole blob or a range of pages (e.g., bytes) for a specified blob. The driver 224 transmits the GetBlob command in response to a cloud application 221 request to obtain data from the Virtual Hard Drive. The GetBlob command causes the blob server 233 to ensure a valid lease ID is specified for the blob associated with the VHD before obtaining the pages. When a lease expires, a GetBlob command will be unsuccessful and the blob server 233 may clear the expired lease ID.

The driver 224 receives drive commands and I/O requests from the cloud application 221. In turn, the driver 224 translates the cloud commands and I/O requests to blob commands. The drive commands are used by the cloud application to manage the VHD and the I/O requests are used to access the data stored in the VHD. The drive commands include, among others, CreateDrive, MountDrive, UnMountDrive, DeleteDrive, ListDrive, and SnapshotDrive The CreateDrive command is used by the cloud application 221 to create the virtual hard drive. The cloud application 221 specifies the size and the format for the virtual hard drive. For instance, the cloud application 221 may format the virtual hard drive as a single partition single volume using the Windows® NTFS file system. In turn, the driver 224 translates the drive command to appropriate blob commands that are available in the blob namespace. The driver may then transmit, to the blob store 230, the blob commands, e.g. PutPage, LeaseBlob, etc., which create a blob for the VHD.

The MountDrive command is used by the cloud application 221 to mount the VHD. When mounting a VHD, the cloud application 221 may specify the amount of local disk space to use as the local cache 225 for the mounted VHD. The cloud application 221 may also request an exclusive write VHD, write VHD, shared read only VHD, etc. The exclusive write VHD means only the cloud application 221 may update the VHD. The write VHD means the cloud application 221 may update the VHD and that other cloud applications may update the VHD in turn. The shared read only VHD means that the VHD is read only, and other virtual machines 220 may concurrently read from the same VHD. The driver 224 may prevent writing to a read only VHD because a lease ID may not be associated with the corresponding blob of the VHD. In turn, the driver 224 translates the MountDrive command to the appropriate blob commands. For instance, the driver 224 may transmit, to the blob store 230, the LeaseBlob command to get and maintain a lease on a blob corresponding to the VHD. Additionally, the driver may routinely renew the lease on the blob to continue providing the cloud application 221 with access to the VHD. If the lease is not renewed, the cloud application write requests 221 may be unsuccessful.

The UnmountDrive command is used by the cloud application 221 to unmount the specified VHD. The UnmountDrive command may cause the driver 224 to terminate the lease for the blob associated with the specified VHD. When the fabric computer 210 or virtual machine 220 fails, the driver 224 may automatically issue the UnmountDrive command to terminate any leases for blobs used by the fabric computer 210 or virtual machine 220.

The DeleteDrive command is used by the cloud application 221 to delete the specified VHD. The DeleteDrive command may cause the driver 224 to transmit a blob command that terminates the lease for the blob associated with the specified VHD. In some embodiments, the driver 224 may transmit a ClearPage command to remove all pages for the blob associated with the specified VHD. After deleting the VHD, the data in the blob is not available to the cloud computing platform or cloud application 221.

The ListDrive command is used by the cloud application 221 to list all VHDs associated with the cloud application 221. The ListDrive command may cause the driver 224 to locate each lease ID associated with a cloud application 221. In some embodiments, the driver 224 may transmit, to the cloud application 221, a letter or numeral corresponding to each lease ID available to the cloud application 221. The driver 224 may also receive numerals or letters associated with snapshots or other drives without lease IDs.

The SnapshotDrive command is used by the cloud application 221 to obtain snapshots of each VHD associated with the cloud application 221. The SnapshotDrive command may cause the driver 224 to locate a blob associated with the VHD and transmit a SnapshotBlob command to the blob store. In turn, the driver 224 may return a letter, numeral, or timestamp, e.g., date and time, of the snapshot to the cloud application 221. The snapshot of the blob may be accessed as a VHD by the cloud application 221.

In certain embodiments, the I/O requests from the cloud application 221 are processed by the driver 224. The VHD mounted by the cloud application 221 is accessed to perform the I/O requests on the stored data. The I/O request may include, among other things, read and write requests.

For instance, the VHD may receive read requests from the cloud application 221. The I/O redirection 223 may route the read requests to the driver 224. In turn, the driver 221 may order the read requests with any overlapping prior write requests received from the cloud application 221. This ensures that the read will return the pending updates, only after the write requests are stored in the blob store 230. The driver 224 checks a buffer of recently written data for the requested data. If the buffer does not contain the requested data, the local cache 225 is checked. When the data is available in the local cache 225 and read from the local cache 225, the CRC for the block is checked to ensure the integrity of the data. If there is a CRC mismatch, then the data is removed from the cache, and it is retrieved from the blob store 230.

If the data is not found in the local cache 225, the driver 224 reads the data from the blob store 230. To read the data from the blob store 230, the driver 224 transmits a GetBlob command to access a page corresponding with the requested data. In certain embodiments, reading data from the blob store 230 is conditioned on having a valid lease ID. After the data is read and validated, the data is returned to the cloud application 221. When the data is retrieved from the blob store 230, the driver 224 determines whether to cache the data based on the size of the local cache 225, cache replacement policies, etc. If the data is to be stored in the local cache 225, the data is stored and a CRC code is calculated and stored. The CRC can be stored with the data, or may be written later to a different location on the fabric computer 210.

The cloud application 221 writes data to the VHD. The I/O redirection may route write requests to the driver 224. In turn, the driver 224 may order the incoming I/O requests with respect to the pending read and write requests. The driver 224 transmits the write request to the blob store 230. In one embodiment, the driver 224 orders all overlapping write requests to the blob store, and only transmits nonoverlapping write requests in parallel to the blob store 230. When there are pending overlapping read or write requests, an incoming write request will be ordered and have to wait until the overlapping I/O requests are transmitted to blob store 230 and acknowledged.

After the overlapping requests are ordered, the incoming write is transmitted to the blob store 230. The write is conditional based upon a valid lease ID for a blob corresponding to the mounted VHD. If the lease has expired, the write request fails. In this case, the driver 224 may try to reacquire the lease; if it cannot the write still fails. When a write request is successful, it is made durable by storing the write request in the blob store 230 and replicating the write before acknowledging the success back to the cloud application 221.

If a write request timed out (e.g., no acknowledgement was received from the blob store 230) then the driver 224 retries the write request. The driver 224 may also retry the write request when the blob store transmits a "timeout" or "server busy." The driver 224 returns success once the retry succeeds at the blob store 230. In another embodiment, the driver ensures that a stale write (e.g., an unacknowledged write request transmitted to the blob store 230) does not duplicate a subsequent retry. The stale writes may be discarded by waiting to obtain a blob server timeout message or waiting for the blob server timeout period. Accordingly, before performing an overlapping write request to the write retry range, the driver 224 ensures that stale writes are flushed through the system by waiting for their blob server timeout period to pass. The blob server 233 discards the stale writes after a given amount of time has passed. Alternatively, the driver 224 may reset the lease or a sequence number associated with the blob. A change in lease ID may prevent a stale write with an expired lease ID from updating the blob store 230. Optionally, the sequence numbers associated with the blob may increment after each successful write request. When the driver 224 does not obtain an acknowledgement from the blob store 230, the driver 224 increases the sequence numbers to inform the blob store 230 that any earlier writes with an earlier sequence number should be discarded. Accordingly, the blob store 230 ignores all stale writes, and all future writes from the driver 224 uses the new lease ID or sequence number.

The blob server 233 stores a sequence number for the blob in the blob store 230. The sequence number is used by the blob server 233 to deny access to the blob when the blob server receives stale writes. When using the sequence number, every PagePut or PageClear command passes in a sequence number, and the sequence number included in the command is checked to determine whether it is greater than or equal to the sequence number stored with the blob in the blob store. The command may be successful when the sequence number included in the command is greater than or equal to the sequence number stored with the blob in the blob store. Otherwise, the command fails.

In one embodiment, when mounting a VHD the sequence number for the corresponding blob is set to 0. All writes to the VHD and its corresponding blob pass in sequence number 0. In turn, the blob server 233 accepts the write since the passed in sequence number matches the one stored for the blob. If one of the writes timeout, the driver 224 does not know if the write is sitting in a queue waiting to execute. After a timeout periods, e.g. 10 seconds, the driver 224 sends a request to the blob server 233 to increment the sequence number associated with blob having the outstanding write. The blob server 233 increments the blob's sequence number to 1. Thereafter, the driver 224 transmits writes for the VHD with a sequence number of 1 to the blob server 233, which successfully implements the received writes in the blob. If a stale write with a sequence number of 0 arrives at the blob server 233 after the sequence numbers are updated, the blob server 233 discards the write since the passed in sequence number is less than the one stored for the blob.

In one embodiment, the cloud computing platform executes cloud applications that create VHDs. The VHDs store data that is used by the cloud applications. In turn, a blob store representing the VHD is managed by a driver to interpret the native cloud application commands and I/O requests as blob commands for the blob corresponding to the VHD.

Figure 3:
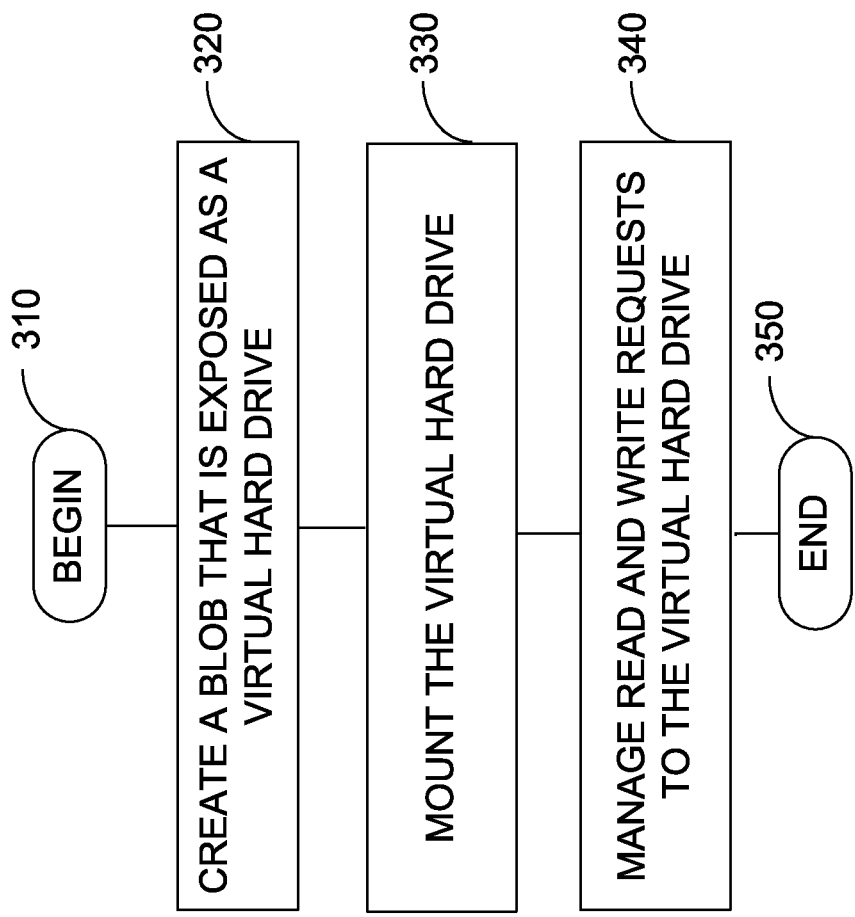
FIG. 3 is a logic diagram that illustrates an exemplary method to create a blob that is exposed as a virtual hard drive.

FIG. 3 is a logic diagram that illustrates an exemplary method to create a blob that is exposed as a virtual hard drive (VHD). The method initializes in step 310. The cloud computing platform creates a blob in a blob store that is exposed as a VHD, in step 320. In one embodiment, the cloud computing platform may format the VHD as one of an N-T-F-S file system or an F-A-T file system. In turn, the VHD is mounted by one or more applications executing on a virtual machine in the cloud computing platform, in step 330. In step 340, a driver manages read and write requests to the VHD. The driver intercepts all I/O to the VHD and reroutes the I/O to the blob in the blob store. The writes in the I/O requests are committed to the blob store before acknowledging success back to the application. Exclusive write access may be provided to the blob for a cloud application via a blob lease that expires after a specified time period. The driver may execute a thread that continuously renews the lease so the VHD can stay mounted for as long as the application is running and wants to use it. In another embodiment, the lease may be renewed each time there is a successful update to the blob. In turn, the cloud application conditionally writes to the blob based on the validity of the lease while other cloud applications are allowed to read from the blob.

The blobs are accessed and manipulated via a blob interface available to the driver. A snapshot of the blob may be created via the blob interface to allow additional applications to concurrently read data stored in the blob. In certain embodiments, the blobs may also be uploaded, downloaded, or debugged via a blob interface available to some cloud applications executed by the cloud computing platform. The cloud application may execute a debugger to check for consistent storage of data. The method terminates in step 350.

In some embodiments, the driver manages the I/O requests for the cloud application. The driver translates the I/O requests destined for a VHD to appropriate blob commands that are transmitted to a corresponding blob in the blob store. In turn, the blob store accesses the blob to implement the blob command.

FIG. 4 is a logic diagram that illustrates an exemplary method to manage I/O requests to a virtual hard drive. The method initializes in step 410. In step 420, I/O requests are received for a VHD from a cloud application executing on a virtual machine in the cloud computing platform. In one embodiment, the driver associates a sequence number with the I/O request to prevent overwriting prior write requests with recent write requests to the same data. The sequence number also prevents stale writes from overwriting recent write requests. In some embodiments, the driver may increase the sequence number for the blob and the sequence numbers passed in with the blob command to ignore a prior write request having an older sequence, where the prior write request was not acknowledged by the blob store. In step 430, a driver manages the I/O requests to the VHD. The driver orders all overlapping I/O requests to the blob in the blob store and transmits nonoverlapping I/O requests in parallel to the blobs corresponding to the VHD in the blob store. In another embodiment, a local cache on the virtual machine is updated by the driver with a write request, where the update to the local cache occurs either after an acknowledgement is received from the blob store, or in parallel with an update to the blob store. But the update in the local cache is available only after acknowledgement is received from the blob store. All or part of the local cache may be flushed by the driver after cloud application failure or virtual machine failure, when the cache and blob are inconsistent upon restarting the cloud application or virtual machine. The method terminates in step 440.

In summary, the cloud computing platform provides VHDs using the blobs in the blob store. For instance, a database application may be executed on the cloud computing platform. In the database application, the log is written in a sequential manner. The log is used for a fairly large number of writes, e.g., redo/undo records, BTree change records, and commit records. The dedicated "log drive" prevents contention between log access and data access. The dedicated "database drive" is used to access (write and read) data in the database. The proportion of "log drive" reads is very small and the database drive has a high proportion of both reads and writes.

The database application executing the cloud computing platform may create two VHDs: a "log drive" and a "database drive." In turn, the blob store creates two blobs that correspond to the "log drive" and "database drive," respectively. The database application mounts the "log drive" and sets no caching because the majority of log traffic is log writes. In turn, cloud application mounts the "database drive," and sets 100% caching allowing most of the read requests to be served by the local cache.

The foregoing descriptions of the embodiments of the invention are illustrative, and modifications in configuration and implementation are within the scope of the current description. For instance, while the embodiments of the invention are generally described with relation to FIGS. 1-4, those descriptions are exemplary. Although the subject matter has been described in language specific to structural features or methodological acts, it is understood that the subject matter defined in the appended claims is not necessarily limited to the specific features or acts described above. Rather, the specific features and acts described above are disclosed as example forms of implementing the claims. The scope of the embodiment of the invention is accordingly intended to be limited only by the following claims.

We claim:

1. A computer-implemented method to manage virtual hard drives as blobs in a cloud computing platform, the method comprising:
    creating a blob in a blob store that is exposed as a virtual hard drive to one or more applications, wherein exclusive write access is provided to the blob for an application via a blob lease that expires after a specified time period;
    mounting the virtual hard drive; and
    managing read and write requests to the virtual hard drive, wherein a driver intercepts all I/O requests to the virtual hard drive and reroutes the I/O requests to the blob in the blob store and a snapshot of the blob is created via a blob interface to allow additional applications to concurrently read data stored in the blob, the application writes in the I/O requests are committed to the blob store before acknowledging success back to the application.

2. The computer-implemented method of claim 1, wherein the one or more applications are executed on a virtual machine and the read and write requests are managed by a driver in the cloud computing platform.

3. The computer-implemented method of claim 1, further comprising: formatting the virtual hard drive as one of an N-T-F-S file system or an F-A-T file system.

4. The computer-implemented method of claim 1, wherein blobs are accessed and manipulated via a blob interface available to the driver.

5. The computer-implemented method of claim 1, wherein blobs are uploaded, downloaded, or debugged via a blob interface available to some applications.

6. The computer-implemented method of claim 1, wherein the application conditionally writes to the blob based on the validity of the lease while other applications are allowed to read from the blob.

7. One or more computer readable media not a signal per se storing instructions to perform a method to manage virtual hard drives as blobs in a cloud computing platform, the method comprising:
    receiving I/O requests for a virtual hard drive from an application executing on a virtual machine in the cloud computing platform; and
    managing, by a driver, I/O requests to the virtual hard drive, wherein the driver orders overlapping I/O requests to the blob in the blob store, and transmits nonoverlapping I/O requests in parallel to the blobs in the blob store; and
    updating a local cache on the virtual machine with a write request, wherein the update to the local cache occurs either after an acknowledgement is received from the blob store, or in parallel with a write to the blob store but the update is available after the acknowledgement is received from the blob store.

8. The computer-readable media of claim 7, wherein a sequence number is associated with the I/O request to prevent overwriting prior writes with older stale writes to the same data that is still in the cloud computing platform.

9. The computer-readable media of claim 8, wherein the driver increases the sequence numbers to ignore a prior write that was not acknowledged by the blob store.

10. The computer-readable media of claim 7, wherein all or part of the local cache is flushed after an application or virtual machine failure when the cache and blob are inconsistent.

11. A cloud computing platform that manages virtual hard drives as blobs, the cloud computing platform comprising:
   fabric computers configured to execute virtual machines that implement applications, which access virtual hard drives to read and write data; and
   blob stores configured to store blobs that are exposed as virtual hard drives to the applications and the blobs are leased for a specific period of time by the applications that are configured to continuously renew the leases to maintain access the virtual hard drives corresponding to the blobs, wherein different application programming interfaces and semantics enable access to the blobs and virtual hard drives.

12. The cloud computing platform of claim 11, wherein the fabric computers comprise a local cache that caches blob data, a blob library storing blob commands, and a driver that translates virtual hard drive I/O instructions to blob commands.

13. The cloud computing platform of claim 12, wherein the local cache stores a cyclic redundancy check code for each data block to determine whether an error exists in the data block before using the data block.

14. The cloud computing platform of claim 13, wherein the local cache and the blob are synchronized to allow the application to complete requests using the data stored in the local cache.

* * * * *